US011175156B2

(12) United States Patent
Herman et al.

(10) Patent No.: US 11,175,156 B2
(45) Date of Patent: Nov. 16, 2021

(54) METHOD AND APPARATUS FOR IMPROVED LOCATION DECISIONS BASED ON SURROUNDINGS

(71) Applicant: FORD GLOBAL TECHNOLOGIES, LLC, Dearborn, MI (US)

(72) Inventors: David Michael Herman, Oak Park, MI (US); Stephen Jay Orris, Jr., New Boston, MI (US); David Joseph Orris, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 16/217,552

(22) Filed: Dec. 12, 2018

(65) Prior Publication Data

US 2020/0191593 A1 Jun. 18, 2020

(51) Int. Cl.
| | |
|---|---|
| *G01C 21/36* | (2006.01) |
| *G01C 21/34* | (2006.01) |
| *G06Q 10/02* | (2012.01) |
| *G06Q 50/30* | (2012.01) |
| *G05D 1/00* | (2006.01) |
| *G06K 9/00* | (2006.01) |

(52) U.S. Cl.
CPC ..... *G01C 21/3623* (2013.01); *G01C 21/3438* (2013.01); *G01C 21/362* (2013.01); *G05D 1/0088* (2013.01); *G06K 9/00812* (2013.01); *G06Q 10/02* (2013.01); *G06Q 50/30* (2013.01); *G05D 2201/0213* (2013.01)

(58) Field of Classification Search
CPC ............ G01C 21/3623; G01C 21/3438; G01C 21/362; G05D 1/0088; G05D 2201/0213; G06K 9/00812; G06Q 10/02; G06Q 50/30

See application file for complete search history.

(56) References Cited

U.S. PATENT DOCUMENTS

| | | | |
|---|---|---|---|
| 9,177,224 B1 | 11/2015 | Heller et al. | |
| 9,530,235 B2 | 12/2016 | Strelow et al. | |
| 9,635,251 B2 | 4/2017 | Wagner et al. | |
| 9,983,022 B2 | 5/2018 | Horita et al. | |
| 9,989,969 B2 | 6/2018 | Eustice et al. | |
| 10,106,153 B1* | 10/2018 | Xiao | B60W 30/00 |
| 10,134,286 B1* | 11/2018 | Elswick | G06Q 50/30 |
| 10,504,008 B1 | 12/2019 | Powers et al. | |

(Continued)

OTHER PUBLICATIONS

Davison et al., "MonoSLAM: Real-Time Single Camera SLAM", IEEE Transactions on Pattern Analysis and Machine Intelligence, vol. 29, No. 6, Jun. 2007, 16 pgs., IEEE Computer Society.

(Continued)

*Primary Examiner* — Fadey S. Jabr
*Assistant Examiner* — Naeem Taslim Alam
(74) *Attorney, Agent, or Firm* — Gregory P. Brown; Brooks Kushman P.C.

(57) ABSTRACT

A system includes a processor configured to receive image data of a scene around a user location, including identification of a plurality of vehicle objects within the image. The processor is also configured to process the image data to determine where stopping spaces, not occupied by vehicle objects, exist within the image. The processor is further configured to select a determined stopping space and provide the selected stopping space to a passenger and driver to arrange a pickup location for a ride request.

20 Claims, 14 Drawing Sheets

(56) References Cited

U.S. PATENT DOCUMENTS

| | | | |
|---|---|---|---|
| 10,670,416 B2 | 6/2020 | Wheeler et al. | |
| 2011/0285810 A1 | 11/2011 | Wagner et al. | |
| 2012/0300020 A1 | 11/2012 | Arth et al. | |
| 2013/0057686 A1* | 3/2013 | Genc | G08G 1/0133 348/148 |
| 2014/0111647 A1 | 4/2014 | Atsmon et al. | |
| 2016/0055749 A1* | 2/2016 | Nicoll | G08G 1/096844 340/932.2 |
| 2017/0011631 A1* | 1/2017 | Nordbruch | B62D 15/0285 |
| 2018/0218605 A1* | 8/2018 | Mowatt | G06Q 30/0284 |
| 2018/0286239 A1* | 10/2018 | Kaloyeros | G08G 1/144 |
| 2018/0286240 A1* | 10/2018 | Harai | B60W 50/14 |
| 2018/0341274 A1* | 11/2018 | Donnelly | H04W 4/46 |
| 2018/0357907 A1 | 12/2018 | Reiley et al. | |
| 2018/0373936 A1* | 12/2018 | Kim | G06K 9/00228 |
| 2019/0145765 A1 | 5/2019 | Luo et al. | |
| 2019/0156206 A1 | 5/2019 | Graham et al. | |
| 2019/0259182 A1 | 8/2019 | Sarukkai et al. | |
| 2020/0041303 A1* | 2/2020 | Friedman | G01C 21/3492 |
| 2020/0089973 A1 | 3/2020 | Efland | |
| 2020/0124427 A1* | 4/2020 | Kline | G01C 21/32 |
| 2020/0125107 A1* | 4/2020 | Schlicht | G06F 21/6218 |
| 2020/0226926 A1* | 7/2020 | Suzuki | B62D 15/0285 |
| 2020/0380711 A1* | 12/2020 | Luo | G06T 7/60 |

OTHER PUBLICATIONS

Sanchez et al., "Localization and tracking in known large environments using portable real-time 3D sensors", Computer Vision and Image Understanding 149 (2016) pp. 197-208, Elsevier.

Balzer et al., "CLAM: Coupled Localization and Mapping with Efficient Outlier Handling", CVPR2013, Computer Vision Foundation, IEEE Xplore, 8 pgs.

Salarian et al., "Accurate Image based Localization by applying SFM and coordinate System Registration", 2016 IEEE International Symposium on Multimedia, Electrical and computer Engineering Department, University of Illinois at Chicago, Chicago, USA, 4 pgs.

Piasco et al., "A survey on Visual-Based Localization: On the benefit of heterogeneous data", Pattern Recognition 74 (2018) pp. 90-109, Elsevier.

Yassin et al., "A Survey of Positioning Techniques and Location Based Services in Wireless Networks", 2015, IEEE, 5 pgs.

Yeh et al., "A Study on Outdoor Positioning Technology Using GPS and WiFi Networks", Proceedings of the 2009 IEEE International Conference on Networking, Sensing and Control, Okayama, Japan, Mar. 26-29, 2009, 5 pgs.

Huang et al., "6-DOF VR Videos with a Single 360-Camera", 2017 IEEE Virtual Reality (VR), Mar. 18-22, 2017, Los Angeles, CA, USA, 8 pgs.

Arth et al., "Wide Area Localization on Mobile Phones", Graz University of Technology, Austria, 10 pgs.

Brejcha et al., "State-of-the-Art in Visual Geo-localization", Faculty of Information Technology, Brno University of Technology, Czech., 45 pgs.

Ni et al., "Real-time Global Motion Blur Detection", MIT Lincoln Laboratory, 2012 IEEE, ICIP 2012, pp. 3101-3104.

Arth et al., "Real-Time Self-Localization from Panoramic Images on Mobile Devices", IEEE Internatioanal Symposium on Mixed and Augmented Reality Science and Technology Proceedings, Oct. 26-29, Basel, Switzerland, 10 pgs., 2011 IEEE.

Gasparini et al., "Optimizing Image Registration for Interactive Applications", University of Modena and Reggio Emilia, Italy, 10 pgs.

Lynen et al., "Get Out of My Lab: Large-scale, Real-Time Visual-Inertial Localization", Computer Vision and Geometry Group, Department of Computer Science, ETH Zurich, Google, Inc., Mountain View, CA, 10 pgs.

Sattler et al., "Fast Image-Based Localization using Direct 2D-to-3D Matching", ICCV 2011, 2011 IEEE, 8 pgs.

Vidal et al., "Automatic Video to Point Cloud Registration in a Structure-From-Motion Framework", 5 pgs.

Sattler et al., "Are Large-Scale 3D Models Really Necessary for Accurate Visual Localization?", Computer Vision Foundation, IEEE Xplore, 10 pgs.

Carrera et al., "3D Scene Reconstruction with a Mobile Camera", Stanford University: CS231A, 10 pgs.

Zamir, Amir Roshan, "Visual Geo-Localization and Location-Aware Image Understanding", M.S. University of Central Florida, 2013, Spring Term 2014, 2014 Amir Roshan Zamir.

Han et al., "A review of algorithms for filtering the 3D point cloud", Signal Processing: Image Communication 57(2017) 103-112, Elsevier.

Manweiler, "Satellites in Our Pockets: An Object Positioning System using Smartphones", Mobisys' 12, Jun. 25-29, 2012, Low Wood Bay, Lake District, UK 2012, 14 pgs.

Lim et al., "Real-time Image-based 6-DOF Localization in Large-Scale Environments" 8 pgs., 2012 IEEE.

* cited by examiner

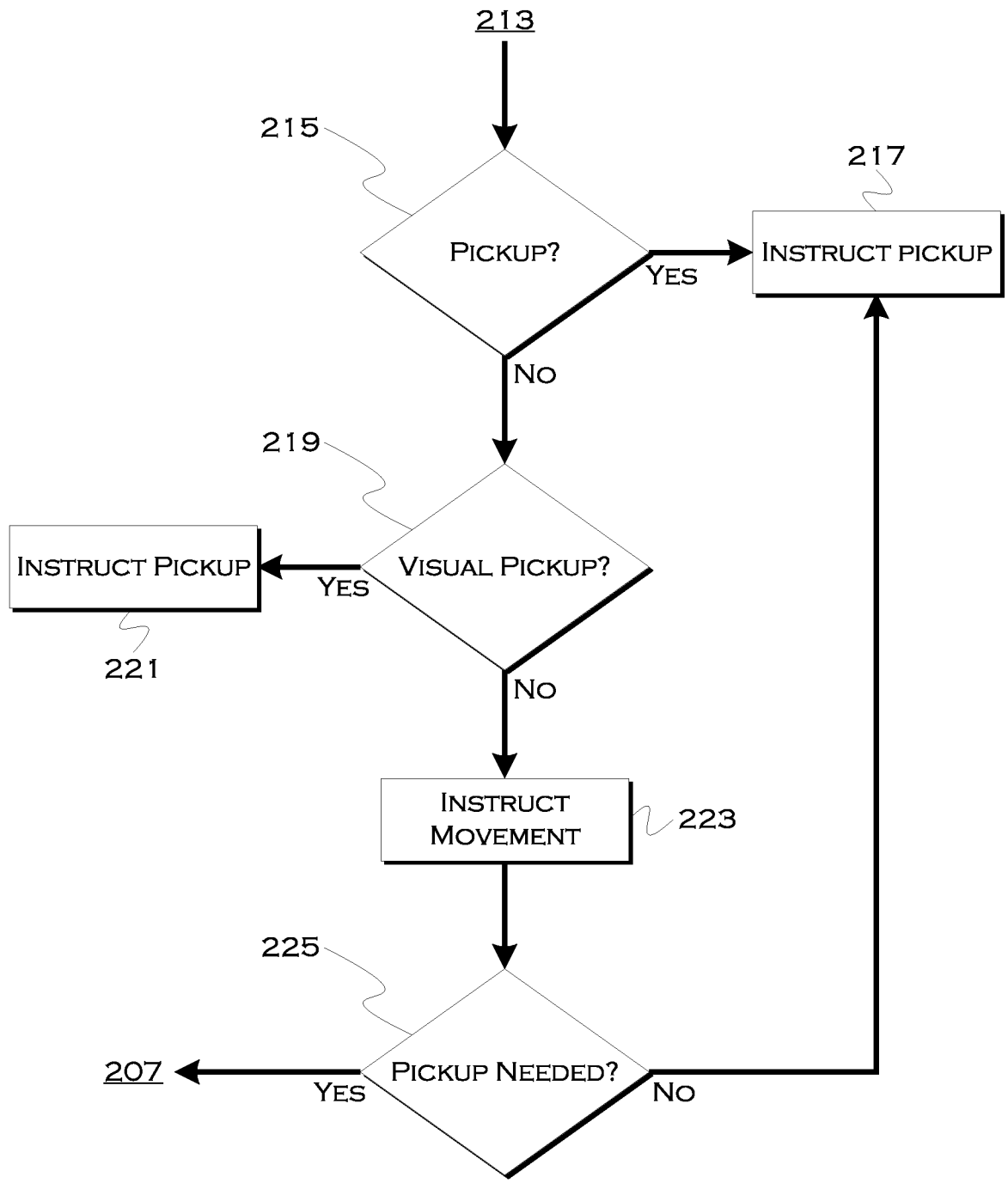
FIG. 2 (CON'T.)

METHOD AND APPARATUS FOR IMPROVED LOCATION DECISIONS BASED ON SURROUNDINGS

The illustrative embodiments generally relate to methods and apparatuses for improved location decision based on surroundings.

BACKGROUND

A ride hailing service is dependent on the capability for the user and vehicle to identify each other's position accurately so the user can enter the vehicle and begin their service. Delays in user's and vehicles identifying each other's location accurately results in decreased utilization (higher costs) and potential missed rides, or loss of revenue. Positional accuracy of a mobile device, however, which is typically used to identify a requesting user's location, may be limited due to technical limitations of GNSS solutions and cellular triangulation.

Users of ride hailing services and the vehicles/drivers themselves must be able to visually identify each other through some method, however limited sight lines due to obstructions or other environmental variables can increase the amount of time spent looking for the vehicle. An example of this issue would be a user being located at the corner of a building but being located by GNSS or cellular triangulation on the wrong side of the corner, which could result in the driver looking for the user in the wrong place, which would cause delay. Another example may be a user located on a section of the street which does not allow parking. For an autonomous vehicle (AV) and/or human drivers, this fact may prevent or delay pick up.

SUMMARY

In a first illustrative embodiment, a system includes a processor configured to receive image data of a scene around a user location, including identification of a plurality of vehicle objects within the image. The processor is also configured to process the image data to determine where stopping spaces, not occupied by vehicle objects, exist within the image. The processor is further configured to select a determined stopping space and provide the selected stopping space to a passenger and driver to arrange a pickup location for a ride request.

In a second illustrative embodiment, a method includes requesting a passenger to image their surroundings, responsive to a travel request. The method also includes receiving the requested image. The method further includes identifying stopping spots in the requested image, based on predefined location characteristics and a lack of vehicles being present, determined from the image, in the identifiable stopping locations. Also, the method includes considering a weighted passenger-impact of choosing each of the stopping spots and choosing a stopping spot having a weighted passenger-impact below a predefined threshold.

In a third illustrative embodiment, a method includes requesting a passenger to image their surroundings, responsive to a travel request. The method further includes receiving the requested image. The method also includes identifying stopping spots in the requested image, based on predefined location characteristics and a lack of vehicles being present, determined from the image, in the identifiable stopping locations. The method additionally includes considering a weighted driver-impact of choosing each of the stopping spots and choosing a stopping spot having a weighted driver-impact below a predefined threshold.

DETAILED DESCRIPTION

Figure 1:
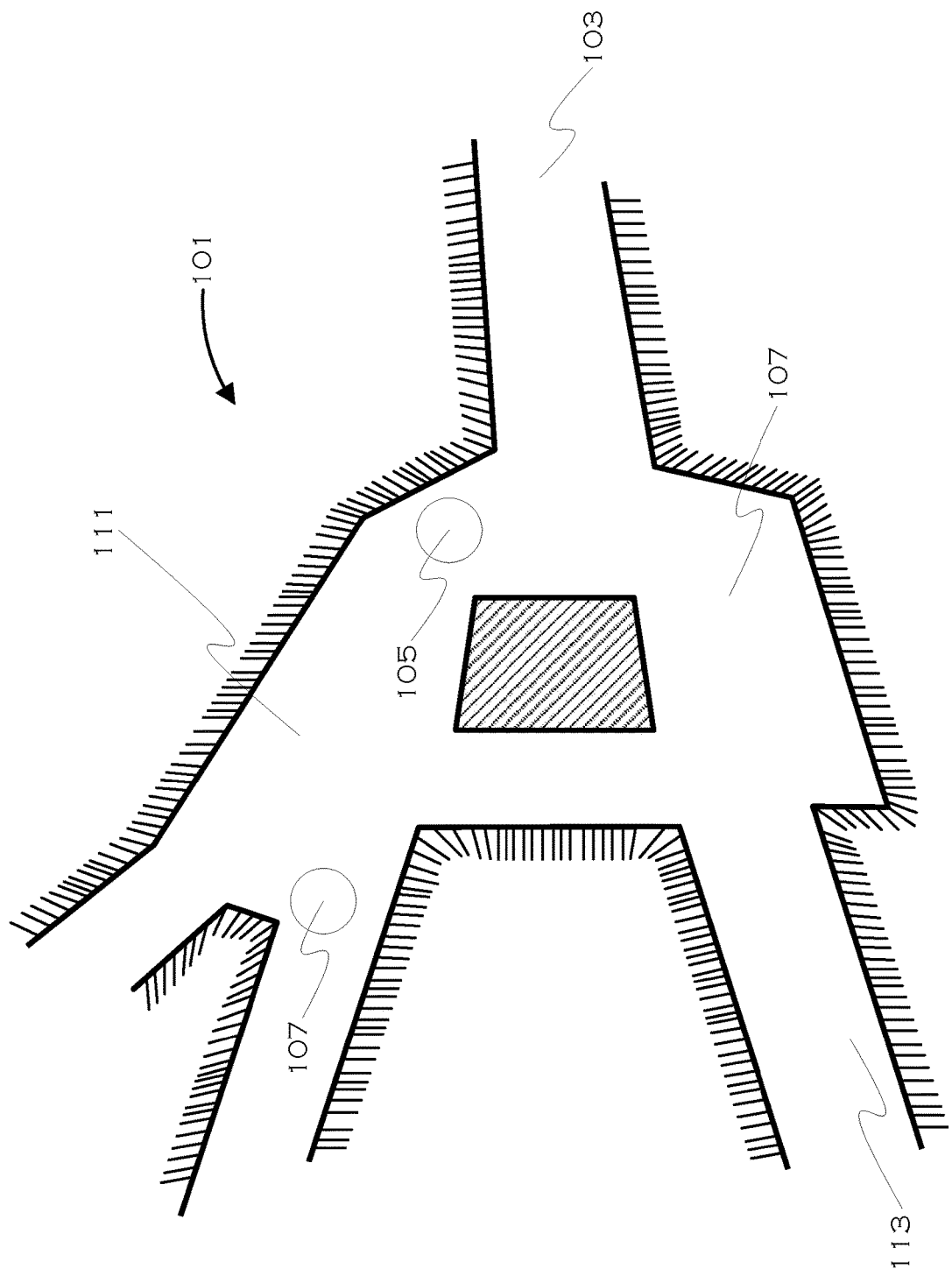
FIG. 1 shows an illustrative example of a city environment.

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

It is well known that GPS positional accuracy is intrinsically limited and can suffer from further errors due to external conditions such as the effects of "urban canyons". This can make it challenging for hailed vehicles, human or autonomous, to positively locate pedestrians. This may lead to longer delays between riders, vehicles finding the incorrect person(s), or even a rider being stranded after a vehicle cannot find the user at the location GPS has indicated. This is even more of an issue in an urban environment where sight lines of pedestrians and vehicles are limited.

For example, a pedestrian may be waiting on one side of a building but the vehicle may only have sight lines on another side of the building where it navigated to based on erroneous signals. Additionally, in city environments, repositioning the vehicle to locate the user would take more time than a suburban or rural environment. In this city environment it may make more sense to relocate the passenger prior to pick-up. The illustrative embodiments are capable of utilizing visual data coupled with cooperating passenger interaction to improve the efficiency of passenger pick-up transaction. This can include, for example, more accurately locating a passenger location and/or the passenger and vehicle collaborating to agree upon an efficient pickup location based on an initial passenger request location.

To date, some methods other than GPS have been utilized to localize a user. For example, ride hailing services allow a user to localize themselves by placing a pin on a map on a user's cell phone. While this may be an improvement to the initial GPS location, the position suggested may have limited precision and the user may be confused by the map orientation compared to their current physical space. Studies have shown that GPS coordinates can be off by over 50 feet under certain weather conditions, even in an open environment, and can be off by hundreds of feet in urban canyons. In a busy city environment, even an error of 20 or 30 feet can misplace a user on the wrong side of a street or a different street, and because of traffic and road constraints, this can render many pickups a practical impossibility.

In other cases, the driver and user may call one another to provide verbal instructions for navigation or further localization. This method can easily fail if the user or driver is unfamiliar with the location or there are not notable landmarks that the user can describe. In the future, where autonomous vehicles (AVs) are prevalent, there will likely be a larger density of ride hailing/sharing/pooling users in a given location. This will increase the rate of false positives compared to today's positional accuracy impacting a fleet operator's ability to control route optimization. Clearly a better method to localize and correctly identify a user in outside environments is needed. Secondarily, a better method to recommend an alternative nearby location for meetup is needed based on live conditions around the user, as static map data does not always reflect real-time conditions as would be evidenced by a live or recent imaging (e.g., static images or video) of the passenger's surroundings.

Another reason to improve the localization problem for ride hailing/sharing/pooling is to minimize the cost of downtime. Increased pickup efficiency leads to increased utilization rates, which are an important component of maximizing profitability. Decreasing the rate of a vehicle that is unable to locate a user or the time required to search and load a user can both help the owner/operator maximize profit as well as improving passenger experience.

Under the illustrative embodiments, an application on a user device will generate an accurate position of the user in 3-dimensional space based on a 3D point cloud generated from imaging (e.g. video) taken by the user. Generally speaking, the application would instruct the user to take a video moving the camera around their position to generate a 3D point cloud using a structure from motion algorithm. This point cloud would be used to generate a more accurate location in 3D space and other important information which would be uploaded to the cloud so that the ride hailing vehicle could be provided the most accurate location to meet the user at. The ride hailing service may also use the data to suggest a more efficient location for the user to meet the vehicle at to reduce on-boarding time.

In one set of embodiments, the process may use the visual and map data to identify parking options or pickup options for a passenger and/or driver. For example, there are several potential sources for parking data, including, for example, spaces where vehicles have successfully performed pickups and spaces marked in map data as parking spaces. In addition, visual data can help identify both temporary available spaces and/or pickup zones, even if not designated on map data. This data may also reveal unavailable spaces due to present vehicles or construction.

It may take some time for map data to include all possible parking locations, so the illustrative embodiments can use temporary objects, such as other vehicles, to identify places where vehicles are presently parked, as well as empty spaces within those areas. More is discussed with respect to this concept in FIGS. 5-7.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 shows an illustrative example of a city environment 101. A user may be located at position 105, which in this example would be an unsuitable location for pickup. Also, because of the effect of urban canyons on GPS, the user's device may be reporting the user location as being at position 109. If, for example, road 111 was a one-way road, then a driver driving to position 109, not finding the user, and calling the user, could not simply turn around to pick up the user. Instead, the driver would have to find a path back to position 105, which in a busy city, in traffic, could take a significant amount of time and drastically decrease the driver's ability to earn money. Further, the user may simply tire of waiting and chose another ride option.

As will be discussed in greater detail herein, illustrative processes may request that the user take a brief video of the surrounding environments. This could be done in response to, for example, determining that a user's apparent location is in an environment known (from historical observation) to have margins of error above a predefined threshold. Or, for example, current weather conditions could indicate that the margin of error is historically likely to be above the threshold. In another example, a user could interact with a device to indicate that the detected apparent location is not actually where the user is standing. In other examples, accelerometers in the phone indicate the user is walking or the GPS reported position is unstable or larger standard deviation than a predefined nominal value.

In response to a request, the user may image or shoot video of a surrounding environment. So, for example, in FIG. 1, the user would take video of the environment surrounding position 105 (where the user is actually standing). Image/video processing can then be used to identify a user location relative to known, fixed objects identifiable in the images. For example, if a statue and a building feature are both known and identified based on crowd-sourced data or historic data, in an object database, recognition of both, along with 3D characteristics of both, which would only be viewable from a certain angle, can be used to determine the relative position of a user to both objects.

Some pre-processing may be done on a user device, as discussed herein, and the remainder of the object-matching may be done in the cloud, which may receive a set of pre-processed image data from the user device. Since video files tend to be large, sending pre-processed data may be beneficial if bandwidth and overall data transfer volume is a system constraint, although in certain systems the whole video file could also be sent, if the transfer capability were sufficient and permissible.

Once the process has identified the actual user location (the location relative to a plurality of known, fixed objects), the process may replace the detected GPS location with an actual user location for both a user device and for a driver/vehicle device. If the process also has identified an improved pickup location from the image data (or based on other data), the process may send that information as a suggestion to the user device and/or driver/vehicle device.

So, for example, the process may identify in environment 101 that the user is actually located at position 105, that there is available parking representing a safe pickup location at 107 (viewable from the user location) and that streets 113 and/or 103 are lower traffic streets and safer for pickup than the intersection around point 105. Any or all of these locations could be suggested as alternative pickup locations and the driver could be notified if the user acquiesces to a particular location. Also, since there is live image data available, the process could use the temporal objects to determine, for example, that parking in 107 was filled or that the streets were very busy, and in the latter case could recommend location 103 since it would not require the user to cross any busy streets as identified from the live image data. In other examples, recognized weather and other constraints may aid in a suitable location determination.

Figure 2:
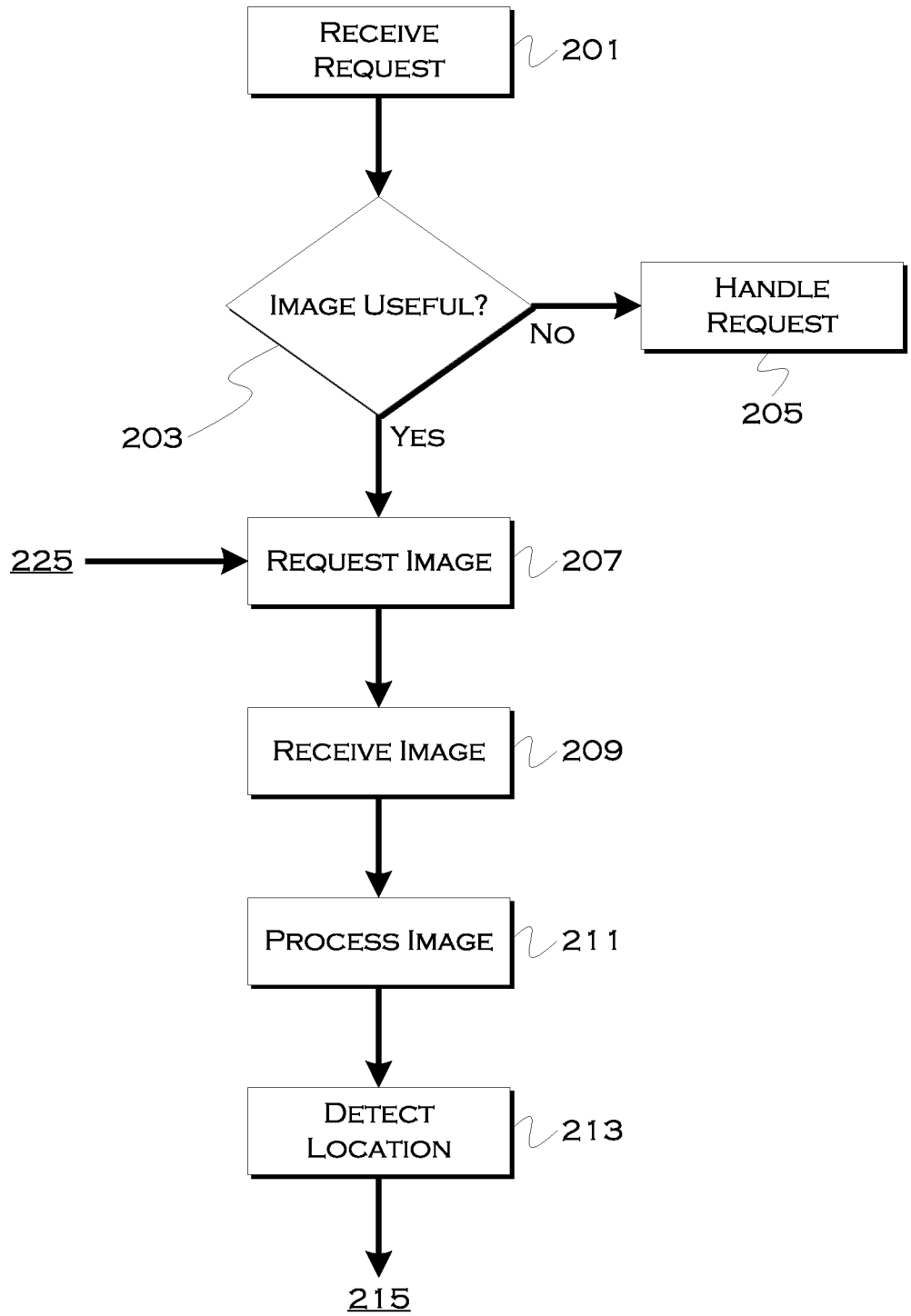
FIG. 2 shows an illustrative process for pickup request handling.

FIG. 2 shows an illustrative process for pickup request handling. In this example, a ride-hailing service receives 201 a request for pick-up. This request may include a detected user location that is detected initially based on, for example, GPS coordinates. If there is a likely margin of error associated with the GPS coordinates (e.g., they are at a location under cloud cover, they are in an urban canyon, etc.), the process may determine 203 that an imaging of user surroundings may improve pinpointing of a user location. If the margin of error is slight enough, the process may simply handle 205 the request based on the detected GPS coordinates.

If the processor determines that the image will improve location determination, the process may request 207 an image of an environment surrounding a user location. This can include a plurality of still photographs, a wide-scale panoramic photograph, a video, etc. In response to the request, the process may receive 209 image data and process 211 the image data to determine a user location. In at least one example, some of this processing is done on a mobile device and can include, for example, the following.

The device performing the processing may use semantic segmentation, for example, to filter the point cloud data and the video data to remove temporal varying objects (e.g., people, vehicles) for purposes of localization. The process may also use a structure from motion algorithm to generate a 3D point cloud of the imaged environment. These objects may also be considered when determining an optimized or alternative pickup location (e.g., finding a space where the objects are not existent, or are diminished).

The process may further convert the 3D point cloud into a voxel map where key features may be identified from the image data. These key features are usable to determine a relative user position to the key features, and are further usable to reduce consideration of image data to points-of-relevance. The process may also hash key voxel features and compute an estimated user position relative to the features.

In this example, the device may perform the above pre-processing and upload the computed relative position and voxel hashes to a central server, which can use a database of object data to actually determine where the viewed features are located.

The database can include a vast array of object data, but the search can be limited to an area based on the initial detected location. So, for example, if the initial location was at position X,Y, and the projected margin of error was +100 feet, then the system could search within a circle having a radius of 300 feet around the detected location. This would, presumably, encompass both the actual user location and a number of viewed key feature points viewed from the user location. The effective goal is to avoid searching too large of a database portion, while at the same time searching a sufficient portion to find a usable enough number of the key features to confirm the user location. Techniques such as using a ball-tree can be used to look up 3D features for matching.

Once the actual location of the key features is identified by correlation from the database, the relative user position to those key features will reveal the actual user location. So, for example, if the user is located relative to a building and a statue, once the actual location of the building and statue are known, the user's relative location will reveal the actual location of the user.

The process may also determine, based on both map data and viewed data, whether the actual location is suitable for pickup 215. That is, map data may indicate a no parking or parking zone at the location, and/or image data may indicate the presence or lack of traffic. If the user location is suitable for pickup, the process may use the user location to instruct 217 pickup.

If the user location is not suitable, the process may attempt to visually identify 219 a pickup location. If there are no visually identifiable pickup locations, the process may simply revert to using the user location. On the other hand, the process may be able to identify open parking spaces and/or low traffic or low pedestrian areas suitable for pickup, based on the presence or lack of temporal objects filtered out through the semantic segmentation. In this case, the process may instruct 223 user movement to the pickup location. Once the user arrives at the pickup location, the process may determine 225 if a new image for pickup purposes is needed. If this is the case, the process may wait until the vehicle is nearing the location, and then request a new image (to confirm the availability of a parking space, for example). If the user has simply been moved to, for example, a generally safer location, but one which is not contingent on space-availability, the pickup for that location may simply be scheduled.

Figure 3:
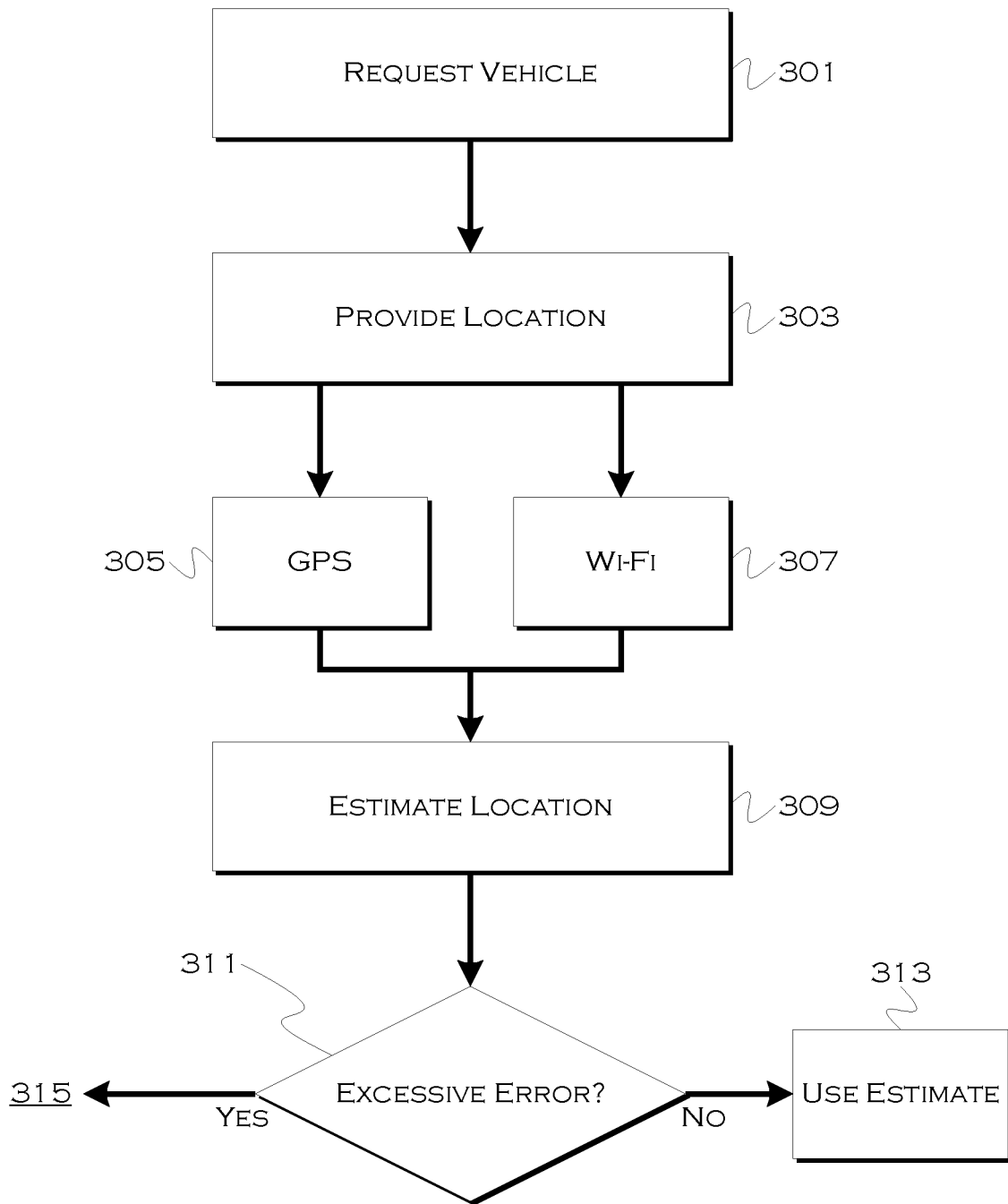
FIG. 3 shows another illustrative example of request handling.
Figure 3:
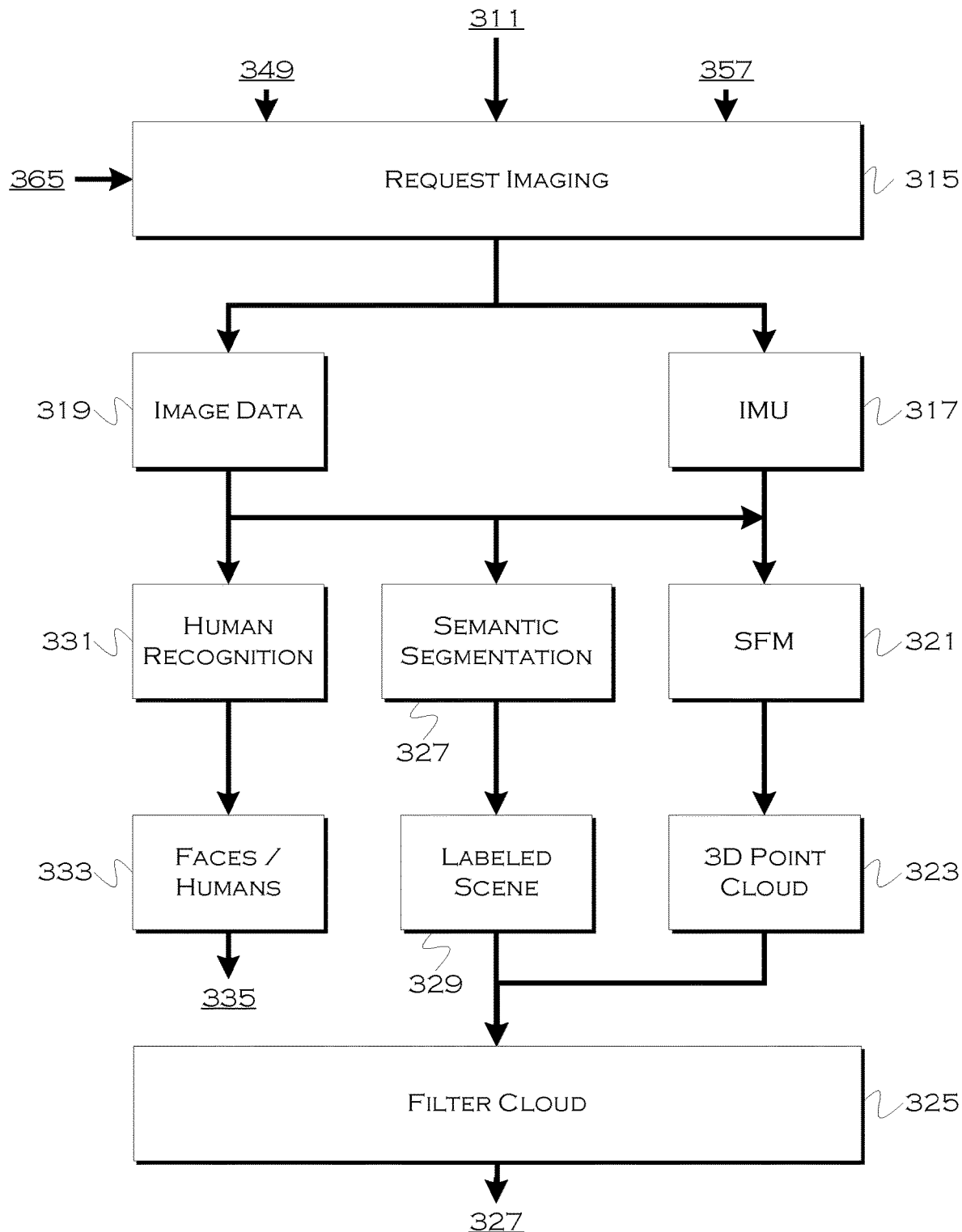
Figure 3:
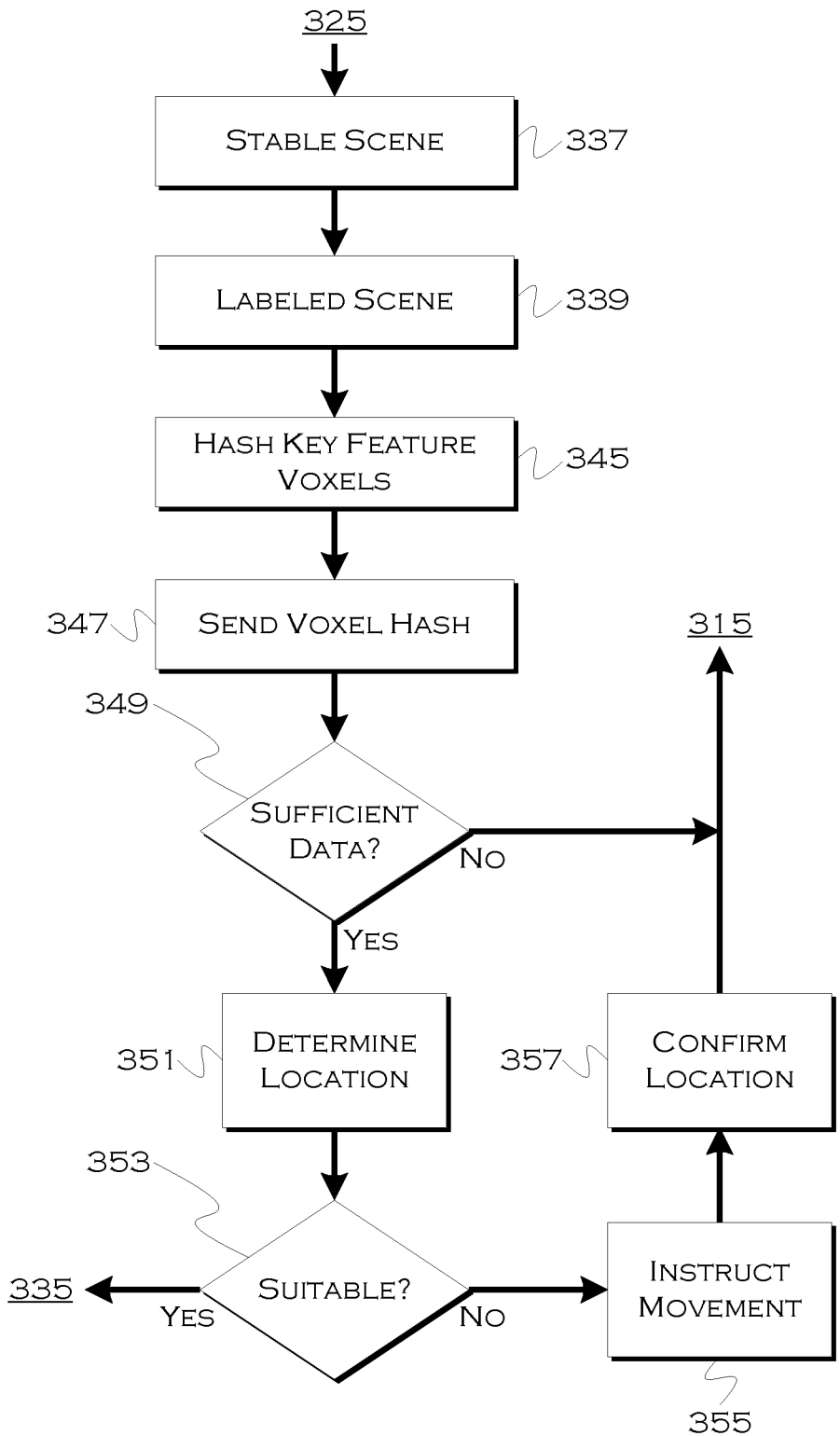
Figure 3:
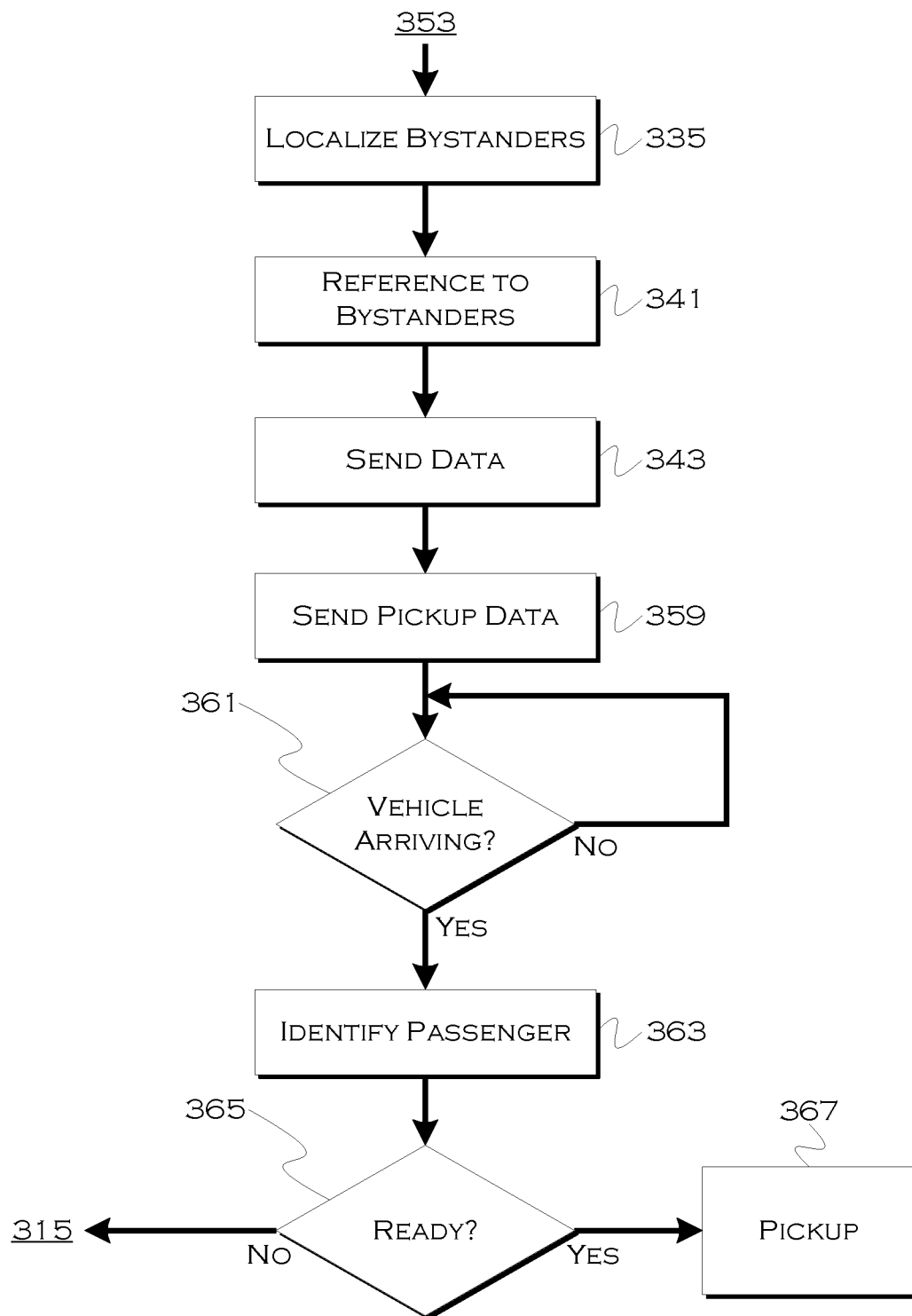

FIG. 3 shows an illustrative process that demonstrates the process of FIG. 2 in more detail. In this example, the process again begins when a user requests 301 a vehicle. This results in the user providing 303 a pickup location, which is the detected user location, for example. The process may attempt to use detected Wi-Fi networks 305 and/or a GPS location 307 to estimate a user location.

In instances where the estimated location is, for example, a location that is likely fairly accurate (e.g., a home in the suburbs), the process may simply use 313 the detected location as a pickup location and proceed. On the other hand, in instances where the location is likely to suffer from inaccuracies (e.g., bad weather, urban canyons) 311, the process may request 315 that a user scan a surrounding location.

A determination that a user may need to scan surrounding areas to image those areas may be based on, for example, location history, which can include: average GPS inaccuracy at estimated location; average delay to pick up customer at estimated location, a rate of users not located events at estimated location. Other factors could include a user history of inaccuracy (the user's device provides bad data), time of day, day of week, etc. Street activity, special events, and other data sources may capture effects of extra busy streets which might make locating a user more difficult. This data may include historical and semi-real time data obtained by other nearby user's scanning their environment to indicate level of traffic, traffic flow, parking space availability, density of pedestrians, etc. Further data may include weather events that affect GPS accuracy and Wi-Fi dataset and accuracy at location.

Business logic may also dictate whether or not the customer is asked to scan an environment. Discussed by example in FIG. 4, the business logic may generally set an upper threshold on the risk of delay and the inability to find a customer that balances the cost of requesting a customer scan his or her location. For example, a request to scan the environment may occur if the risk of delay is greater than 5 minutes or the risk of inability to locate customer is 10%. This request may also be based on the past customers agreement or refusal to scan their environment for localization.

Other factors for querying may include, but are not limited to: the user's past propensity to agree to scanning their location or moving to an alternative pick up location or high definition (HD) map information which may indicate road factors such as lack of available street parking on one or more sides of the road or other similar factors.

If a user may be asked to move, the suggested location distance compared to the decrease in pickup delay and risk of not finding the passenger may be balanced by the cost of the user annoyance to shift location. This may be set by some business logic equation. For example, a request to move N meters away might be required to save N/10 minutes of delay or more.

A request to the user to take video/images of his or her external surroundings at their present location may utilize GPS, inertial measurement units (IMU), detected Wi-Fi networks and the accompanying images generated. For purpose of generating the image, the phone may display a visual or auditory request with an instructional image or animation to help guide the user to start the scan. The cell phone may output continuing auditory or visual instructions during scanning to update the user on the progress of the scan or provide further instructions. The process may also display the video augmented with feature/point cloud/other data as well to improve experience and provide feedback that the process is working.

Additionally, the device may display recommended pan and tilt motion via auditory instructions or via displaying the scene and written or iconographic instructions (e.g., arrows) on the screen facing the user to capture missing perspectives of the current scene. The phone may provide input to the user to slow their motion or panning of the device when capturing images to avoid motion blurring. This can be accomplished by inspecting the resulting images for signs of unidirectional image blur. The phone may recommend the user to pan or tilt in certain directions based on what has been captured so far in the scanning process. The nomadic device, e.g., a cell phone, could image the region repeatedly capturing images as the user moved the phone around as determine by accelerometers to indicated a change in the pan, yaw, or other perspective and if the user is walking through the environment. In addition, as the scene changed the phone would capture additional images even within the same scene to understand temporal nature of the environment (pedestrian flow, traffic flow). Alternatively, a video image can be used.

The phone may then provide confirmation once the scene has been imaged sufficiently to produce a 3D point cloud that has captured the needed 3D scene details to try and localize the user in space. The phone may utilize accelerometers and forward and rear facing camera to determine the motion of the phone which is a composition of the user walking in space and the user moving the phone about the person to gain an adequate view of the scene.

Once an adequate image is obtained, the process may use the IMU 317 data and image data 319 to derive a plurality of aspects of the data. For example, the process may use a structure from motion (SFM) algorithm 321 to derive a 3D point cloud scene around a user.

In another aspect, the process may use semantic segmentation 327 to derive a labeled scene 329 including various temporal objects such as people and vehicles. In still a third aspect, the process may find humans or face in the image 331 to derive a composition of humans that are definitively not the user.

The temporal objects derived from semantic segmentation can be filtered 325 from the 3D point cloud to derive a temporarily stable, labeled 3D scene 337 representative of the view from the user's location. Phones may also have additional cameras or utilize IR dot projection to construct depth maps that would aid in this process.

The structure from motion and following compression into voxel hashes could occur on the mobile device in real-time. By the real-time creation of an augmented reality 3D scene the user may judge their scanning progress (for example, a split window view may show the "real" view and an augmented reality view being generated in real-time. Additionally, the voxel conversion of fixed infrastructure may be displayed on the user's device to provide further feedback on the progress and quality of localization.

The 3D point cloud data and video data will be filtered through use of semantic segmentation to remove temporal varying objects. Temporal objects, e.g., vehicles/pedestrians may be used to determine optimal alternative location for pickup.

The images used to generate the SFM 3D point cloud may include points in space that correspond to objects or visual features that vary in time. For example, people or vehicles may be captured in a recording of the area by the user, but those objects would not correspond to historical mappings of the area stored in databases and the like.

As such, sematic segmentation will be used to classify the pixels in the image corresponding to a designated class. Feature points detected in the respective images which belong to the temporally varying classes, e.g. a car, that are projected into a 3D space using SFM algorithm may be discarded or ignored. The results of this process will be to capture point clouds only from temporally stable features such as fixed infrastructure, building facades, tree foliage, and other features. This will make the process of localization far more stable in to changes in a local environment. In addition, classification of fixed objects may be used later to label the 3D point cloud, voxel map, and by extension the voxel hashes.

Temporally varying objects may also be labeled and measured. They may be directly uploaded to the central server or aggregated into a single statistic (e.g., percentage of open street parking, pedestrian density). This data may be used to determine if an alternative meeting location may be necessary.

A secondary usage for such data may be used to maintain a map of relevant features of a city environment which may be used for vehicle routing information or proactively suggesting a nearby alternative meeting location for nearby user's later request.

The point cloud may additionally be smoothed or filtered via sparse statistical based filtering such as outlier detection, neighborhood-based filtering, projection-based filtering, Laplacian smoothing, and others.

An algorithm may then convert the 3D point cloud into a voxel map 339 where key features may be identified. One effect of this step is to reduce the data transferred to a central server per each user. By converting temporally stable classified point cloud points into a voxel map (and later hashed), the process can dramatically reduce the file size compared to transmitting the raw images to match the image features to a dataset of images.

In the aspect where people are identified, the process can localize a person's location relative to identified bystanders 335, 341. This may be useful, for example, to assist a driver, device or vehicle in identifying a user within a crowd. Since people tend to move around, such an image aspect may be captured moments before the vehicle arrives, and the driver or vehicle could use the images of who the user isn't to help identify who the user is, within a crowd of people.

This will be described later in greater detail, but generally speaking the process can transmit non-user 343 bystanders to the cloud for processing and/or transfer to the vehicle 359. This data can be used to, for example, navigate to a portion of the crowd reflected by the data (and presumably thus near the user) and viewed by the vehicle 361 and/or, for example, provide an augmented reality view of the crowd for a driver that can identify non-user entities and help the driver single out the user.

Moving back to the 3D point cloud data, the process can hash this data 345, for example, the key feature point data, and send the voxel hashes back to a central server for processing. If the server cannot use the present key feature voxel hashes to localize the surroundings 349, the scan process may repeat. Otherwise, the server may use an HD map and/or other image data to localize the key features. Once the actual locations of the key features are known, the relative position of the user, to the features (as determined based on the perspective of view of the features) will reveal the location of the user in the real world.

If this location is optimal or suitable for pickup 353, the process can use the bystander data (or request bystander data when a vehicle approaches) to localize the user at the location and to help guide the vehicle to as near a precise pickup spot as possible.

If the location is not suitable, the process can use HD maps (since the location of the user is now known with precision), and/or other data, including visual image data indicating available parking, to determine a more suitable pickup location 355. This can include a safer location, a location with fewer pedestrians or vehicles, an open parking space, etc. This can also be confirmed 357 with the customer.

As the vehicle arrives, the process can enact filters to sort out visually identified non-users (e.g., in an augmented reality display, based on the user's prior image data provided including images of other pedestrians in the area which may be confused for the intended customer) 363 and also determine if the customer has moved 365. If the customer cannot be found or appears to have moved (which can also be indicated by phone accelerometer data), the process can repeat the scan process. In at least one example, the localized phone processing and reduced cloud-sent data size results in fairly fast processing, so it is not unreasonable from a time perspective to ask a user to re-scan and process the image, even if the vehicle is arriving or has arrived.

Figure 4:
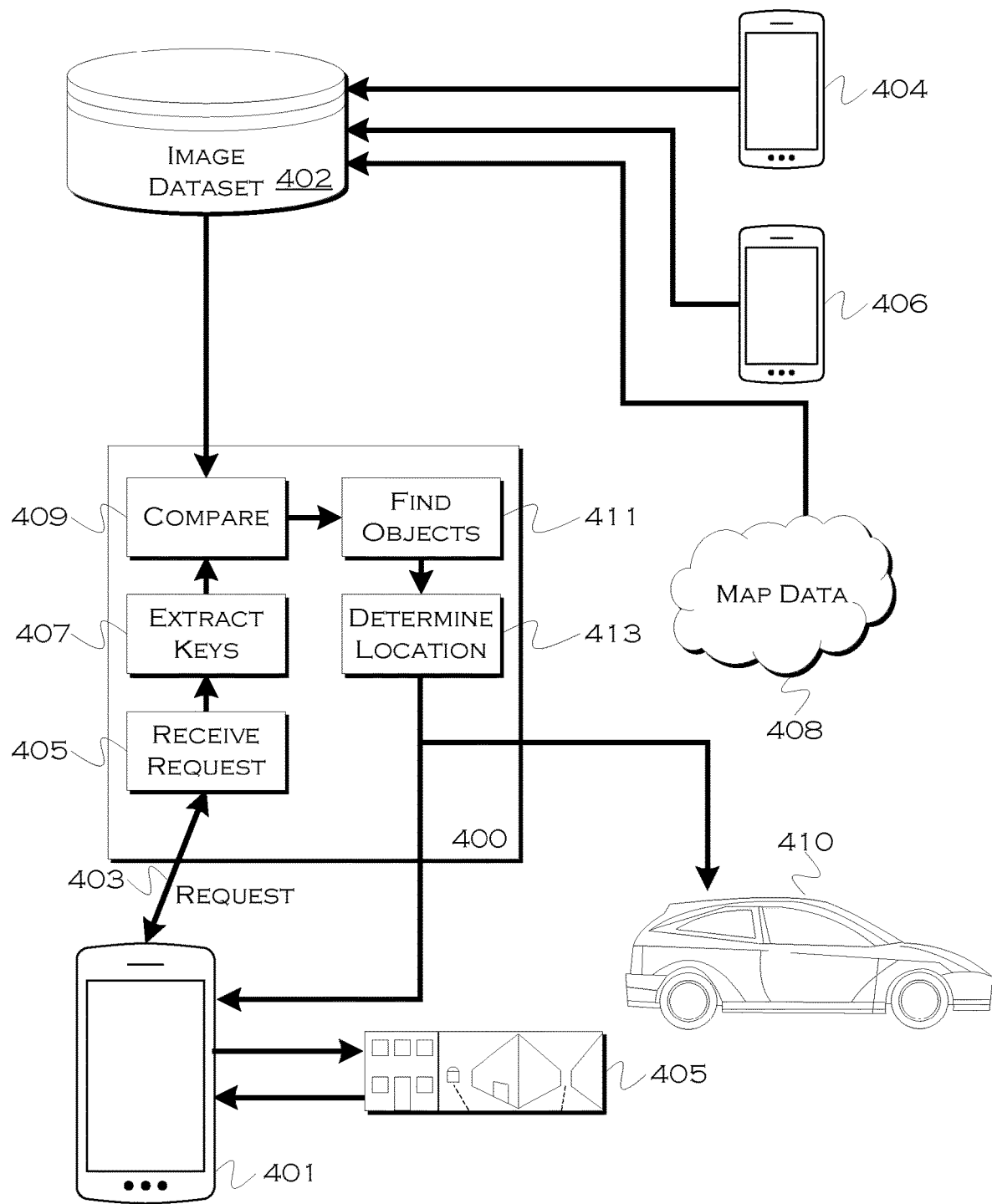
FIG. 4 shows an illustrative system for request handling.

FIG. 4 shows an illustrative system for request handling. This is one example of how the data may flow between entities and sources for various data used in illustrative solutions. In this example, a user or passenger has a mobile device 401 that is used to initiate a request for pickup 403. Since the remote system 400 may require improved location information, the request communication may require back-and-forth communication.

When the remote processing receives the request 405, it can determine if a better location is needed, and, if so, instruct a user to image the surroundings. The user can use the mobile device to scan an image, series of image or video 405 of surroundings. Further, as noted herein, the device may perform some preprocessing on the image before sending the image back to the remote server 400.

Once the server receives, in this example, key image elements as hashed data, the server can unpack the data and extract 407 the key feature elements. In a large image dataset 402, there may be many key features that seemingly replicate. Thus, searching the entire image dataset may produce many results for a key feature. On the other hand, if the remote system searches in localities around the initial projected location, the set of data actually considered may be greatly reduced. Further, because, while a certain feature may appear to replicate, multiple features identified in the received data will typically only be present at a single location. E.g., a building feature may replicate, but there may be only one coincidence of the building feature viewably proximate to a statue feature. Data from various other users 404, 406, as well as HD map data 408, can be used to build the large data set, and the objects in the dataset can have both key feature comparators and physical locations associated therewith. The physical locations can serve as a constraint on the searching, for comparison 409 to the extracted key features. The physical locations can then, when a match is found, be used to physically locate the objects to which the features correspond 411.

By knowing the location of the user relative to the objects (received from the user device, in this case), the remote system can determine an actual user location by extrapolating a relative location to the now-identified physical object locations 413. This actual location can then be sent back to the user to improve the onsite location, as well as be sent to a requested ride 410.

Figure 5:
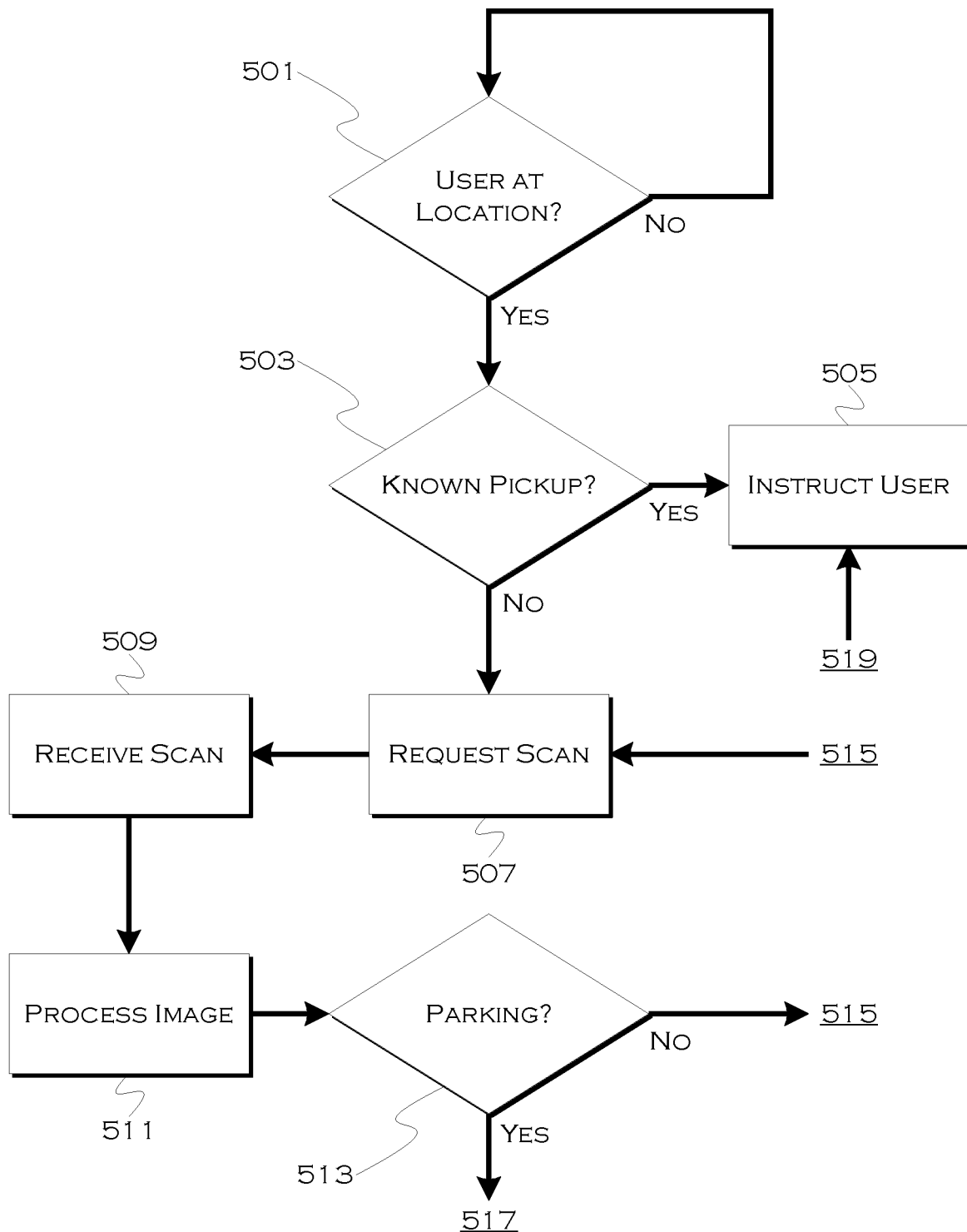
FIG. 5 shows an illustrative example of a pickup location selection process.
Figure 5:
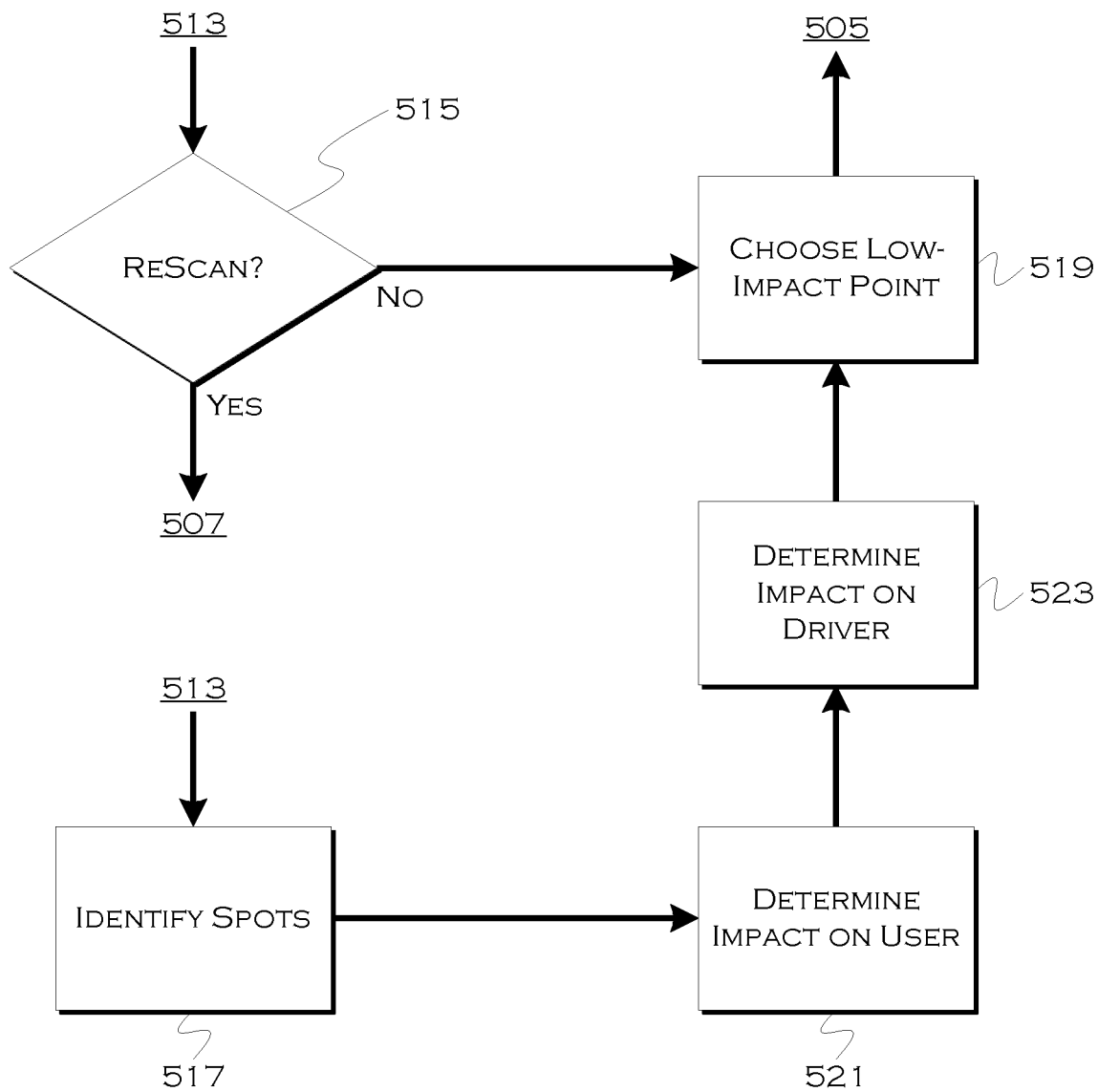

FIG. 5 shows an illustrative example of a pickup location selection process. In this example, after a user location has been accurately assessed, the process may attempt to determine if there is a better location for pickup. Better locations can include, but are not limited to, locations which are more accessible for a driver, locations which will significantly diminish servicing time, locations which are safer for a user/driver, etc.

In this illustrative example, the process may determine 501 whether the user has been located at a defined location. That is, if the margin of error on the location is still high (e.g., the user is using detected GPS coordinates in an urban canyon), the process may wait until the other illustrative embodiments, or the like, have been used to accurately locate the user's true present position.

If the user's location is verified, the process may determine 503 if the present location includes a known pickup location (e.g., a designated or safe pickup zone) or is near a known pickup location that may, for example, be a location constantly cleared of waiting traffic so that rideservicing vehicles can pickup users. If such a location is nearby, or if the user's present location is such a location, the process may instruct the user to travel to the pickup location or wait at the already designated pickup location that is the user's present location.

On the other hand, if the current location is not predefined as a safe or known pickup location, the process may request 507 a scan for parking locations. This could be a resending of the original scan used for locating the user, or this could be a new scan that may include, for example, a better perspective of street-level temporary objects (e.g., people and vehicles). For example, an initial scan may have been aimed higher at building and landmark features, and the new scan may be aimed at eye-level to better identify parking spaces. Fundamentally, the image processing techniques still apply for isolating temporary objects such as vehicles and people, but in this case, instead of being discarded, as may have been the case in the user-location embodiments, these temporary objects can be used to identify places where, for example, vehicles are parked, people are or are not clustered, parking gaps occur, high traffic exists, etc. These and similar factors can aid in decision making with regards to safely choosing a location for passenger pickup.

In this example, the process may receive 509 the scanned image, which in many cases will have had some preprocessing performed thereon by the user's mobile device. In this example, for instance, the process may receive the IMU data, temporary objects (vehicles or vehicle and people), and one or more key feature identifiers. The key feature identifiers may be included to assist in identifying a parking space position relative to a key feature, but the IMU data and temporary vehicle data may also be sufficient to identify parking. Also, in some examples, this second scan may be performed when a driver is close to arriving, to ensure the likelihood that an identified parking space is actually still vacant.

In still further embodiments, a requesting server may ask a user, through device instructions such as text, speech or visual guides, to ensure inclusion of certain areas known or likely to include possible parking. These areas can include spaces where pickups were previously successfully performed (and noted by a database) or where map data indicates parking should exist.

The remote server may process the image to physically locate parking spaces, which can include, for example, identifying map-data based parking spaces and confirming that there are no vehicles within those spaces, or processing the image to identify 513 gaps between parked vehicles. If there are presently no parking spaces identified, the process may repeat 515 until parking is identified.

In other examples, the process may handle the image to identify high/low traffic areas and high/low pedestrian areas. This information can be useful to, for example, place a person in a position where there is a limited crowd of people (to make individual identification easier), ensure that a person is not asked to cross heavy traffic, if avoidable, ensure the person is waiting near a crowd of people (if safety is an issue), etc.

If the process is able to identify an area suitable for parking, the process may further identify 517 vacant spaces within the area. Again, this can be done strictly from the image data, or this may be done using a combination of image and map data, looking for gaps in the image data where the map data indicates parking should exist. This sort of image processing may also be useful to identify temporary impediments to parking, such as construction or a roped-off area, where the map may indicate parking is available. This can help ensure that a user is not directed to an unsafe or unsuitable area for pickup.

In addition to identifying potential spaces, for one or more spaces (or until a suitable space is determined), the process may identify 521 the impact a space would have on a user, and identify 523 the impact a space would have on a driver. This can be useful to determine that a given space is unsuitable for a variety of reasons not related to the immediate availability of the space, such as requiring a user to walk in rain, cross a busy street at night, or require the driver to take a long detour to reach the location. If the impact on each entity (or each entity that a provider cares to accommodate) is suitable, the process can choose 519 a low impact point and instruct the user and driver to meet at that location.

Figure 6:
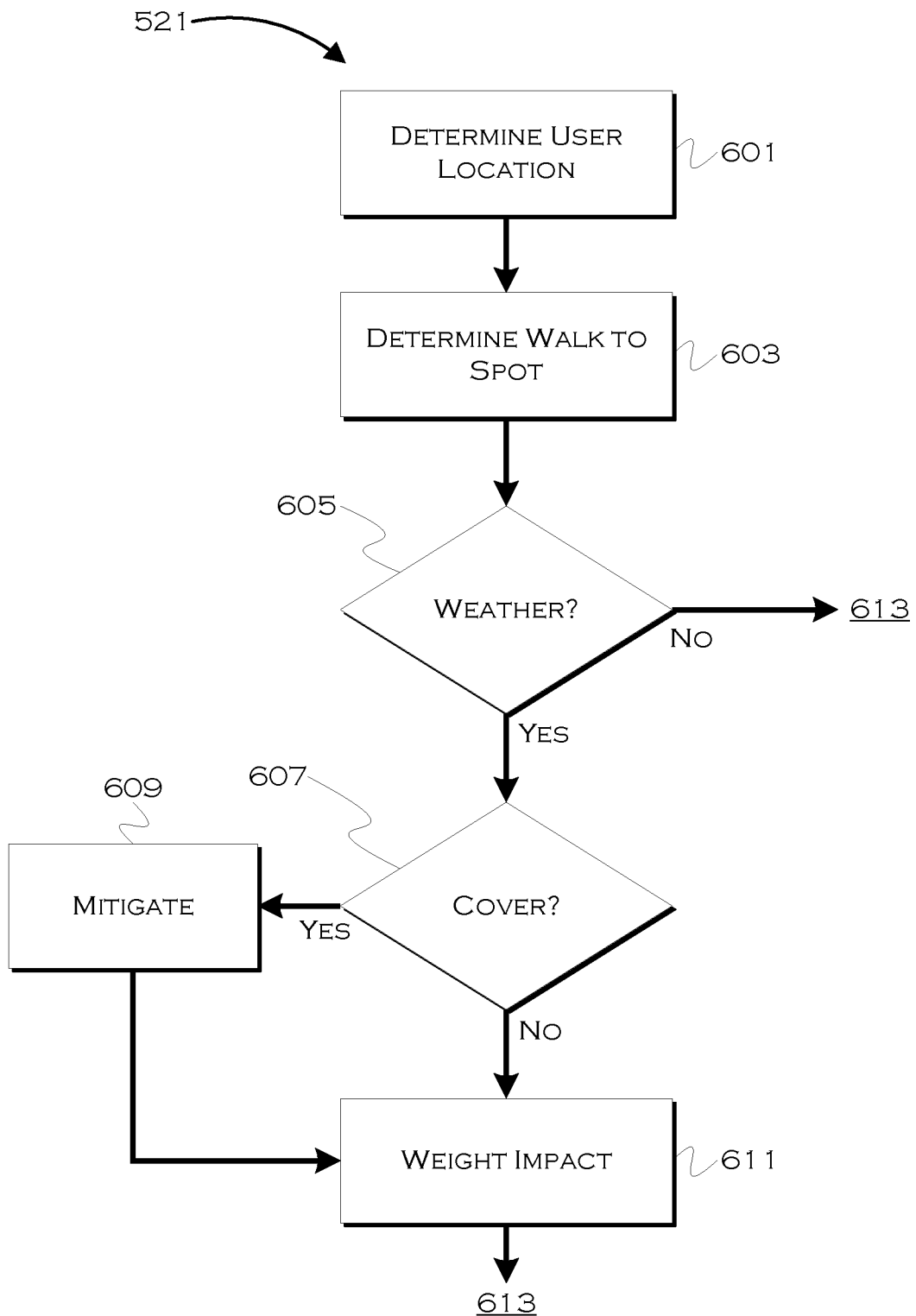
FIG. 6 shows an illustrative example of a user-impact determination process.
Figure 6:
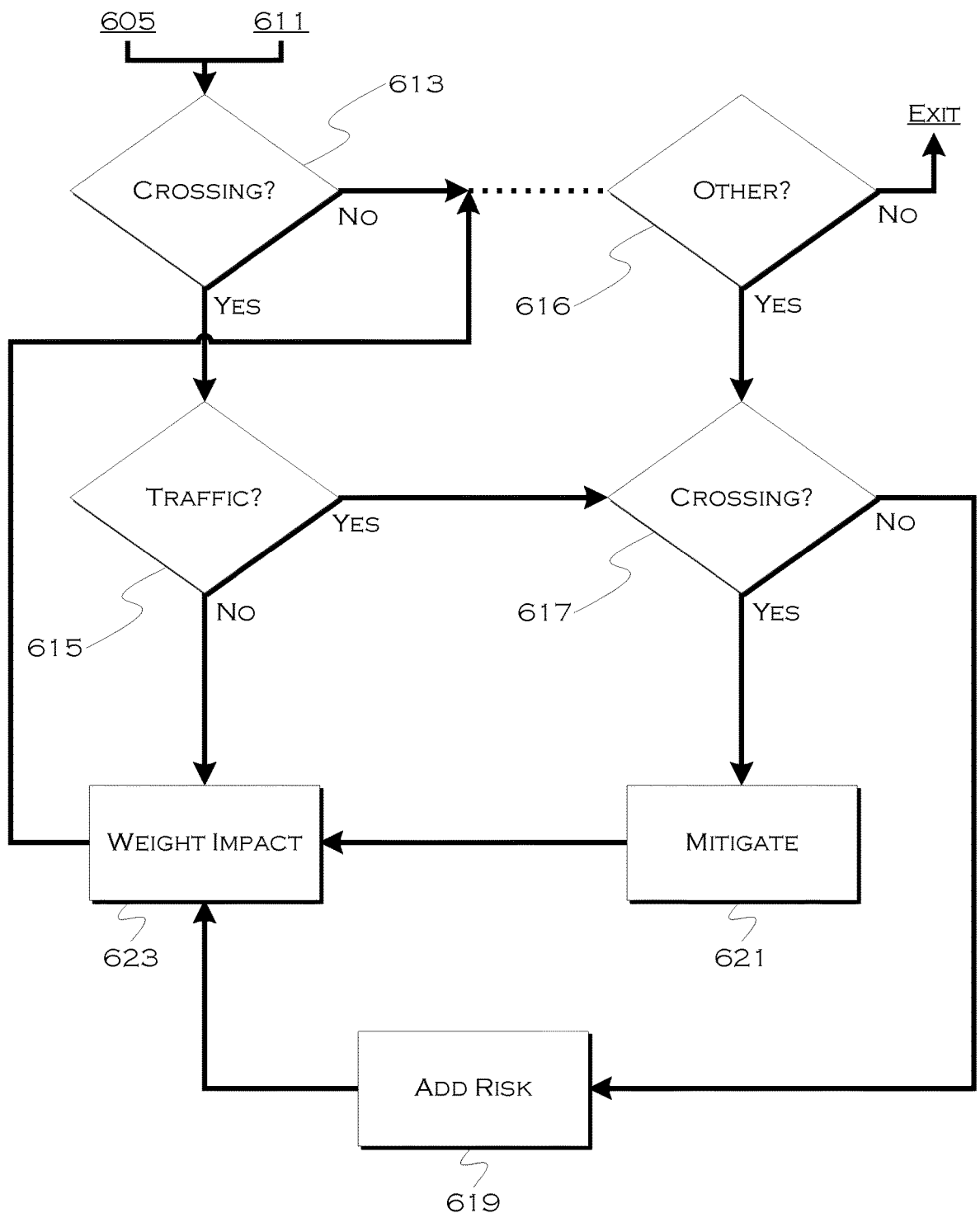

FIG. 6 shows an illustrative example of a user-impact determination process. In this example, the process considers the impact of traveling to a new location on a user. That is, assuming the user has minimal impact by waiting at the current location, the process determines what increased impact will or may occur from events such as, but not limited to, crossing traffic, traveling distances, ongoing weather, etc., dangerous walking conditions, etc.

In this example, the process may utilize 601 an accurately determined user location as the user's present location, and then determine 603 a likely or plurality of likely walking path(s) to a suggested user location. Once the path(s) are determined, the process can begin to calculate a weighted impact. Certain constraints, for example never requiring a user to travel more than 100 feet in excessive precipitation, can also be limiting factors, and can be used to constrain suitable walking paths or stopping space (where the vehicle stops) selection.

In this example, for illustration only, the process determines 605 if there is currently (or projected to be, upon arrival) inclement weather. This could include snow or rain, but could also include cold, hot, icy, etc. conditions. For example, if a user had to walk down a steep hill, it might be very undesirable to require this in icy conditions, even if there was no precipitation. On the other hand, heat or humidity might be a constraint if the user had to walk up that same hill.

In this example, as an instance of a possible mitigating factor, the process also determines 607 if there is cover for some or all of the proposed walking path. This can be used as a mitigating factor, and may be determinable from historic, map or image data, or a combination thereof. Cover can include full cover (and indoor path) and overhead cover. Any mitigation (e.g., areas where the walking path is largely unaffected by the weather) can be applied 609 and then the process can weight 611 the user-impact of the weather. For example, if a walking path was 400 feet, and a constraint was no more than 100 feet in the rain, and it was raining, but 350 feet of the path was indoors, then the process could mitigate the impact of weather for all but 50 feet. There may be a bound on maximum walking distance that is still met, but the weather only impacts a portion of the walking path and thus can be treated as such.

Other examples include, but are not limited to, street crossings 613 along the path. If the user has to cross one or more streets, the process can determine traffic 615 (from the image data, for example) and can also determine if there is a usable crossing 617. This can also be determined from the image data or from map data indicating the crossing. Real time traffic data can be used to determine traffic, but the image data may be more real-time in terms of the immediate locality of the user and what the user has to confront when crossing the street. If there is traffic but is no intersection, for example, the process may add 619 a risk factor or can remove the crossing from consideration altogether. If there is a crossing, the process can mitigate the impact of traffic 621, and again, the process can weight the impact of the crossing 623 on the user. This consideration and mitigation process can continue until all suitable user-impacting factors have been considered.

Figure 7:
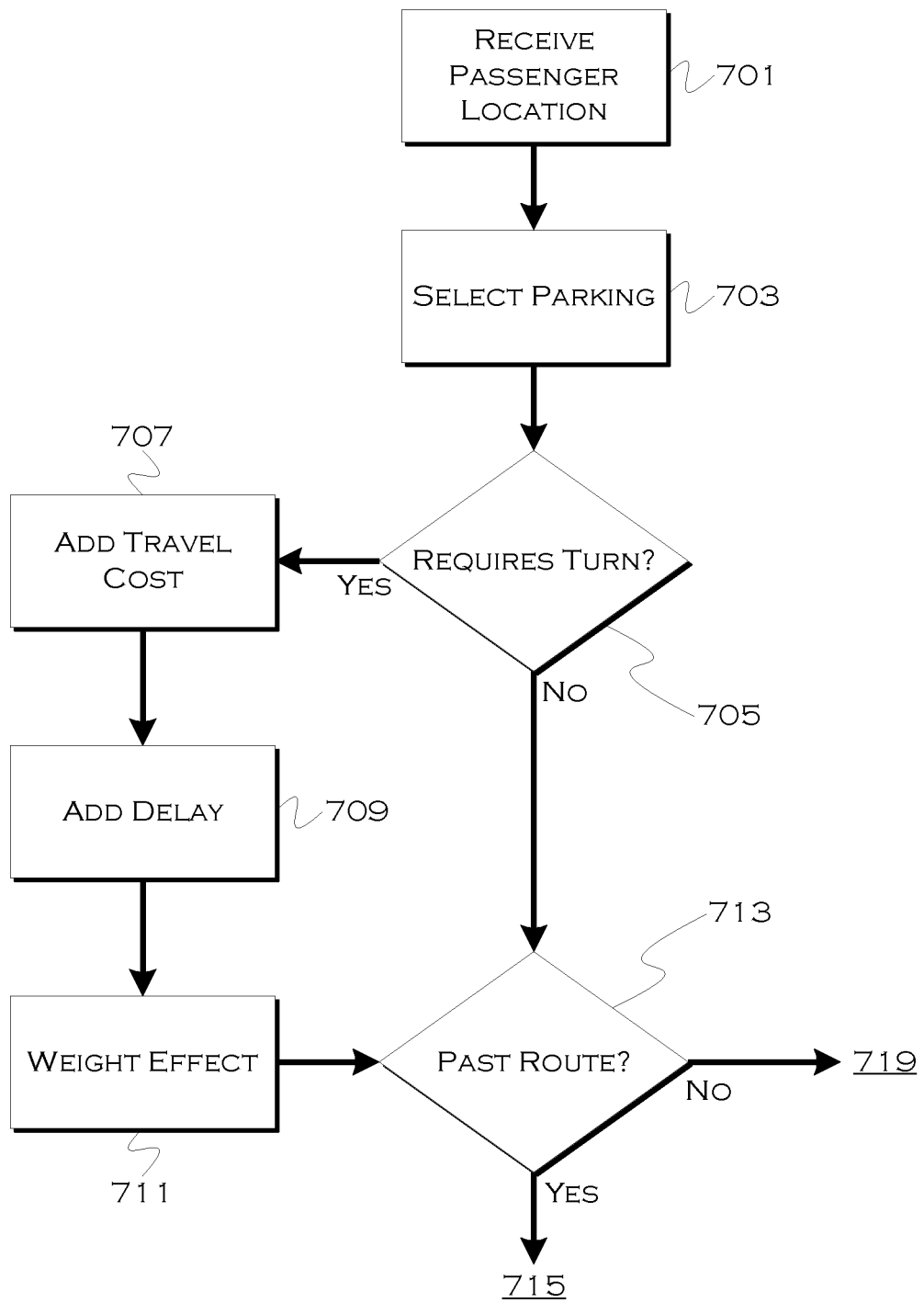
FIG. 7 shows an illustrative example of a driver-impact assessment process.
Figure 7:
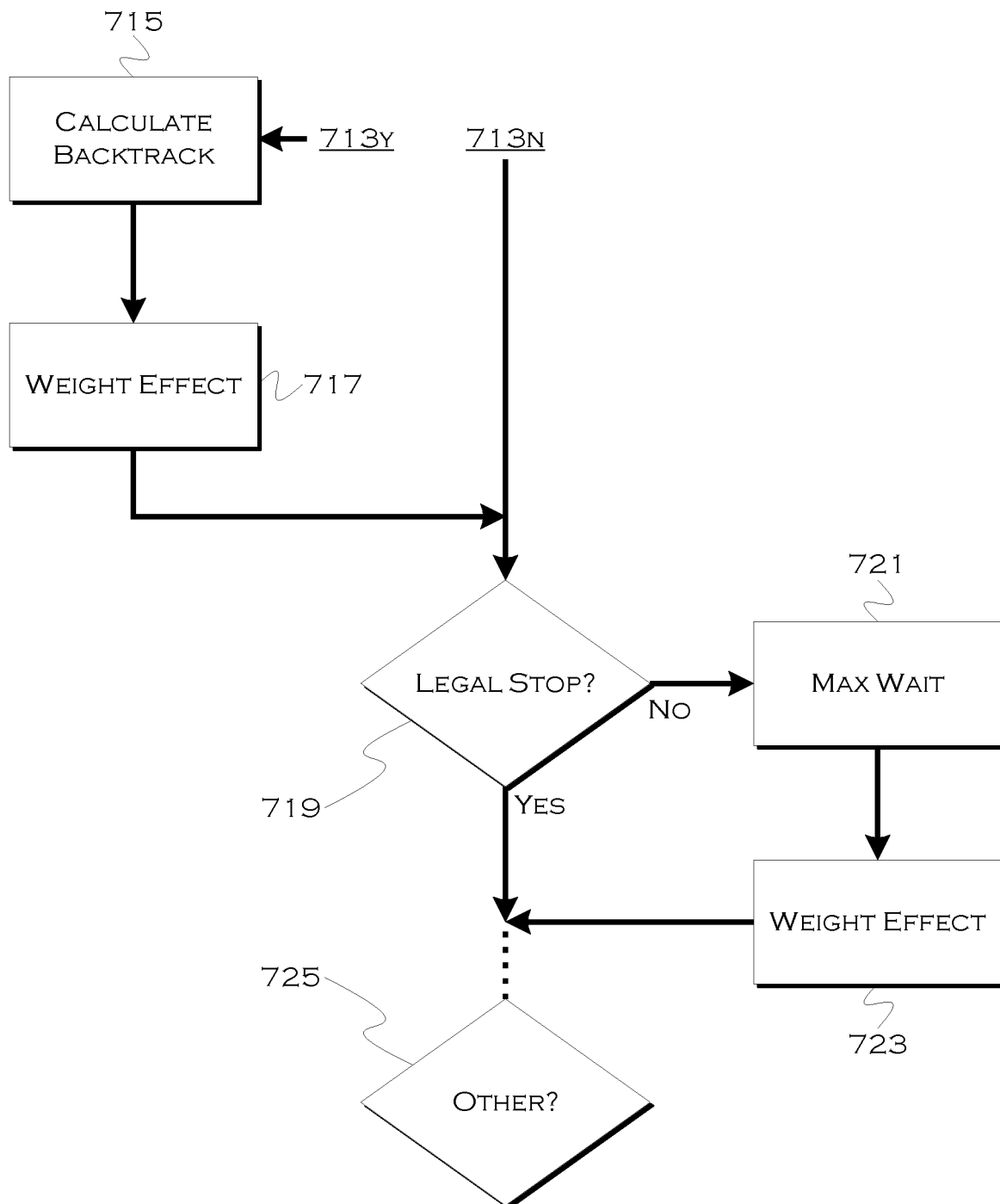

FIG. 7 shows an illustrative example of a driver-impact assessment process. Similar to the passenger-impact process of FIG. 6, this illustrative example demonstrates how the decision engine may consider an eventual impact on a driver.

In this example, the process has one or more eventual potential stopping points in mind. The initial stopping point considered may be a user location, it may be a point selected by viewing the user-generated image, or it may be one or more points selected with user-impact in mind, such that the point(s) reflect points acceptable from a user perspective. Whether the process considers driver impact first, user impact first or both simultaneously, the process is capable of finding points that fit within constraints for either party, constraints for only one party, or a minimized constraint set for one or both parties (e.g., minimize total impact by comparing user+driver weighted impacts for each possible stopping space).

In this example, the process receives 701 a passenger location. This location can be the actual location of the passenger and/or it can include one or more possible passenger relocation sites (e.g., stopping spots). The process can either select 703 one or more received potential stopping spots from the received points, or use the actual passenger location (and passenger image data and/or map data) to select points for consideration as possible stopping spots.

For each stopping spot, or until a suitable stopping spot is found, in some examples, the process may consider 705 the impact of stopping on the spot relative to the driver's present location and relative to picking up the passenger at the passenger's present location. Put another way, the driver would necessarily have to travel to the passenger's present location if no change were made, so the impact is the difference (from a time, fuel, safety, etc.) perspective in a new spot vs. the passenger's current location, or a new spot vs. a preferred or optimized passenger location.

If the goal is to merely minimize the impact on a passenger, then the only consideration may be whether the best spot for the passenger does not exceed any driver constraints (e.g., requiring a 20 minute detour for an otherwise 5 minute pickup). On the other hand, if the goal is to optimize the pickup for both parties or considering the impact on the driver to at least some extent, the process may consider impact-increasing factors such as, but not limited to, turning, backtracking, maximum stopping times, etc.).

If, for example, the process requires one or more turns 705 that may add additional travel time and/or distance (e.g., the driver and passenger are both presently on the same street, but the safer pickup spot is across the street), the process may add any additional fuel 707 expected to be consumed and/or additional delay 709 that may be experienced as a result of moving the location. This consideration can also weight in favor of the driver, for example, by considering a location that requires less travel time or less fuel to achieve, but then which likely requires the passenger to change locations to some extent.

The process can factor in the increased/decreased time/cost and weight 711 an impact resulting from the additional turns (or fewer turns) required by the journey. These would primarily include extra left turns, which, in the United States, often require longer waits, but any turn increasing the travel time or any prevention of a turn decreasing the travel time could be factored in.

The process may further consider whether the driver must actually travel past 713 the alternative pickup spot (e.g. another location or the present passenger location) and then loop back and backtrack back. Because of divided roads, traffic, construction and one-way streets, moving a destination across a road may have a significant impact on a driver, even if it has a minimal travel impact on a passenger. Thus, the process can consider 715 the amount of back-tracking required and can then weight 717 the effect of this accordingly. As with the turns, this calculation can also be in favor of the driver (e.g., moving a location requires less, not more, backtracking) so the weighting can reflect this in a given calculation.

In still a further example, the process may consider whether the new location represents a legal stopping location. While it may not necessarily be illegal for a driver to pickup a passenger at a non-parking location, it may be illegal or discouraged for the driver to wait more than a certain amount of time at a given location. This could be a literal constraint on the system (e.g., if the driver will arrive in 5 minutes, the passenger has to walk 10 minutes, but the legal wait is 2 minutes, the stop is potentially unsuitable) or this could be an impact effecting constraint. If the constraint is not legally prohibitive, but there is not an excessive wait time available as there would be with a legal parking space, the process can consider a maximum 721 (known from map data or historically observed) stopping time associated with the proposed stopping point, and can weight an effect 723 this would have on the overall system. This could be a risk constraint, for example, which weighs the likelihood a driver will be forced to move as opposed to a cost constraint that considers extra fuel or travel time. With cost constraints, the system may seek to minimize cost or keep total weighted cost below a threshold. With risk constraints the system may seek to minimize risk or keep total risk below a threshold. Aggregation of variables may also be useful, e.g., there is a 33% chance a driver will be asked to move from a spot that costs $3 to pickup from, in terms of time, travel and fuel, and a 0% chance with a spot that costs $5, which would be the alternative to the $3 travel space, but which requires an extra $3 of travel from the $3 travel space if the driver is forced to move. So there is either a 100% chance of spending $5 in travel or a 66% chance of spending $3 in travel+a 33% chance of spending $6 in travel ($4 expected cost), making the risk of moving worthwhile. On the other hand, if there is a 5% chance that the driver will also receive a $200 ticket for waiting for too long, the driver is better off going to the $5 travel space, assuming the calculation is passenger agnostic in terms of impact on the passenger.

This and similar considerations can be used to identify one or more optimized parking spaces, assisted by user imaging, and consider the impact of those spaces on passengers and drivers before selecting an alternative to a present user location as a recommended space.

By using temporary objects such as pedestrians and vehicles, identifiable through filtering of visual images, the illustrative embodiments can improve identification of parking spaces, limited crowd areas where pickup may be easier, and safe places to pick up passengers, improving user location services and rideshare servicing times. The novel, uncommon and atypical examples and concepts described herein demonstrate potential improvements achievable through use of those examples, concepts, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to
   receive image data of a scene around a user location, including identification of a plurality of vehicle objects within an image represented by the image data;
   process the image using semantic segmentation, to identify both a presence of temporal varying objects that may move prior to a pickup and an absence of temporal varying objects in regions of the image representative of possible stopping spaces;
   correlate locations that map data indicates are representative of parking locations with locations in a processed 3D point cloud having at least one of less than a threshold of temporal varying objects or an absence of temporal varying objects, as indicated by the semantic segmentation, to determine potential stopping spaces existing within the image;
   select one of the stopping spaces; and
   provide the selected stopping space to a passenger and driver to arrange a pickup location for a ride request.

2. The system of claim 1, wherein the image data includes a known stopping location in visual proximity to the user location.

3. The system of claim 2, wherein the processor is configured to instruct inclusion of the known stopping location through a visual camera guide provided on an image-capturing device interface.

4. The system of claim 2, wherein the known stopping location includes a location where historical data indicates successful previous pickups have occurred.

5. The system of claim 2, wherein the known stopping location includes a location where map data indicates pre-designed parking.

6. The system of claim 1, wherein the processor is configured to evaluate a user impact, experienced by a user when asked to move from the user location to a given possible stopping space, and wherein the given possible stopping space is selected based on the given possible stopping space meeting one or more predefined user-impact characteristics.

7. The system of claim 6, wherein the predefined user-impact characteristics include limitations on a user crossing traffic.

8. The system of claim 7, wherein a severity of traffic, for purposes of the selection based on user-impact relating to crossing traffic, is determined from the image data.

9. The system of claim 6, wherein the predefined user-impact characteristics include limitations on a user travel distance to the stopping space.

10. The system of claim 6, wherein the predefined user-impact characteristics include limitations on user travel distance to the stopping space based on existing weather conditions.

11. The system of claim 1, wherein the processor is configured to evaluate a driver-impact, experienced by a driver when asked to travel from a present driver location to a given stopping space, and wherein the stopping space is selected based on meeting one or more predefined driver-impact characteristics.

12. The system of claim 11, wherein the predefined driver-impact characteristics include limitations on a driver stopping in traffic.

13. The system of claim 12, wherein a severity of traffic, for purposes of the selection based on driver-impact relating to stopping in traffic, is determined from the image data.

14. The system of claim 11, wherein the predefined driver-impact characteristics include limitations on travel time increase relative to other determined stopping spaces.

15. A method comprising:
    responsive to a travel request, requesting a passenger to obtain an requested image of their surroundings;
    receiving the requested image;
    processing the requested image using semantic segmentation, to identify both a presence of temporal varying objects that may move prior to a pickup and an absence of temporal varying objects in regions of the requested image representative of possible stopping spaces;
    correlating locations that map data indicates are representative of parking locations with locations in a processed 3D point cloud having at least one of less than a threshold of temporal varying objects or an absence of temporal varying objects, as indicated by the semantic segmentation, to identify a plurality of stopping locations in the requested image;
    considering a weighted passenger-impact of choosing each of the identified stopping locations; and
    choosing a stopping location having a weighted passenger-impact below a predefined threshold from the plurality of stopping locations.

16. The method of claim 15, wherein the predefined location characteristics include map data indicating permissible stopping locations.

17. The method of claim 15, wherein the predefined location characteristics include visually identifiable location in the requested image, meeting predefined visual characteristics for stopping locations.

18. The method of claim 15, wherein the predefined location characteristics include historically observed locations where successful pickups occurred.

19. The method of claim 15, wherein the weighted passenger-impact includes considering at least additional travel time, additional travel distance and weather-effect on travel, from a current location of the passenger to each of the stopping locations.

20. A method comprising:
    responsive to a travel request, requesting a passenger to obtain an requested image of their surroundings;

receiving the requested image;

processing the requested image using semantic segmentation, to identify both a presence of temporal varying objects that may move prior to a pickup and an absence of temporal varying objects in regions of the requested image representative of possible stopping spaces;

correlating locations that map data indicates are representative of parking locations with locations in a processed 3D point cloud having at least one of less than a threshold of temporal varying objects or an absence of temporal varying objects, as indicated by the semantic segmentation, to identify a plurality of stopping locations in the requested image;

considering a weighted driver-impact of choosing each of the identified stopping locations; and choosing a stopping location having a weighted driver-impact below a predefined threshold from the plurality of stopping locations.

\* \* \* \* \*